Figure 2:
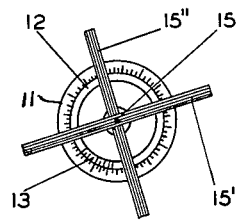

Nov. 18, 1941.          A. H. RINEY ET AL          2,262,965
                           SURVEYING SYSTEM
                         Filed Dec. 27, 1938          3 Sheets-Sheet 1

INVENTOR.
A. H. RINEY
J. D. DURKEE
BY
ATTORNEYS.

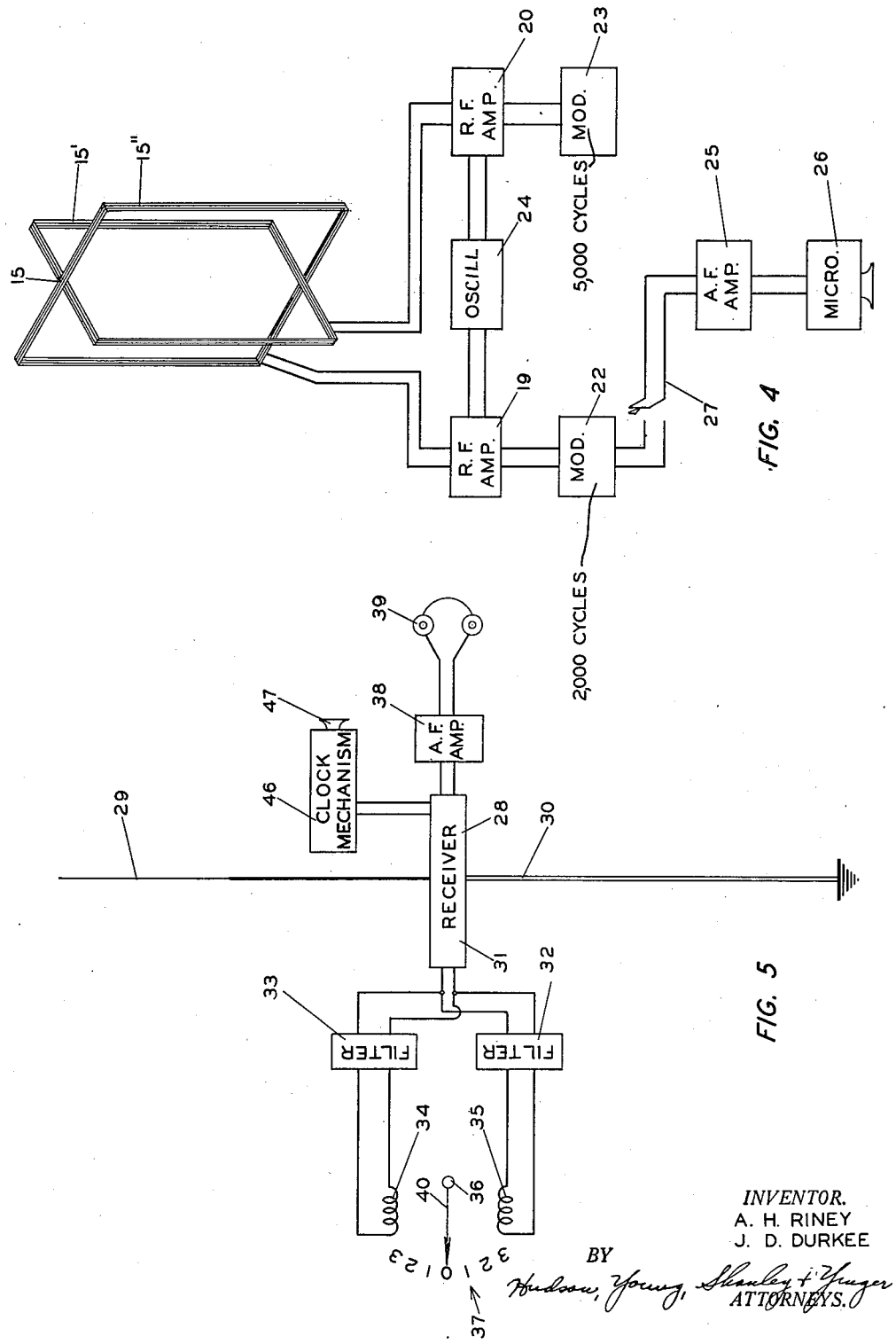

Nov. 18, 1941.   A. H. RINEY ET AL   2,262,965
SURVEYING SYSTEM
Filed Dec. 27, 1938   3 Sheets-Sheet 3

INVENTOR.
A. H. RINEY
J. D. DURKEE
BY
ATTORNEYS

Patented Nov. 18, 1941

2,262,965

UNITED STATES PATENT OFFICE 2,262,965

SURVEYING SYSTEM

Arthur H. Riney and James D. Durkee, Bartlesville, Okla., assignors to Phillips Petroleum Company, a corporation of Delaware Application December 27, 1938, Serial No. 247,998

5 Claims. (Cl. 250—11)

This invention relates to a method of and apparatus for conducting a survey to determine the relative positions of two or more terrestrial points. More particularly, it relates to surveying through the use of a radio beam.

Generally, plane surveying may be divided into three parts: Exploratory surveying, general surveying, and precise surveying. Exploratory surveys are made for the purpose of furnishing general information quickly and with a minimum of expense. Consequently, those instruments and methods are used which will give rough but satisfactory measurements in the least amount of time. Under the head of general surveying may be placed those surveys which are made over small or moderate sized areas to furnish detailed information or to set points. The instruments commonly used to make these surveys are the engineer's transit, level, and steel tape. If detailed information is desired over a very large area more precise instruments and methods must be used to make the survey and making of such measurements is known as precise surveying.

Conducting reconnaissance or exploratory surveys we have found that the present available instruments and methods are inadequate under certain conditions. In swampy or marsh areas the unstable footing and the high and dense vegetation render a great deal of clearing and cutting necessary to obtain sights. The same conditions, as to poor visibility, prevail in heavily wooded areas or in hilly and rugged terrain. Similar conditions are encountered in mines and tunnels so that surveying becomes a slow and tedious process. Many short and off-sights and measurements must be made in such circumstances with resultant delays and increased costs.

In accordance with this, an important object of our invention is to provide a method and apparatus whereby the operations ordinarily performed with a transit, level, and plane table can be carried on through use of a radiant energy source by setting up a directed radio beam.

A further important object of this invention is to provide a method and apparatus for conducting a survey where it is impossible to see between the instrument and the point or points.

A further important object of the invention is to provide a method and apparatus for conserving time and expense in conducting a survey over difficult terrain.

Another important object of this invention is to provide a method and apparatus readily adaptable for use with geophysical prospecting equipment for the surveying and location of shot points and recording stations.

Other objects and advantages of this invention will be apparent to those skilled in this art during the course of the following description.

Figure 3:
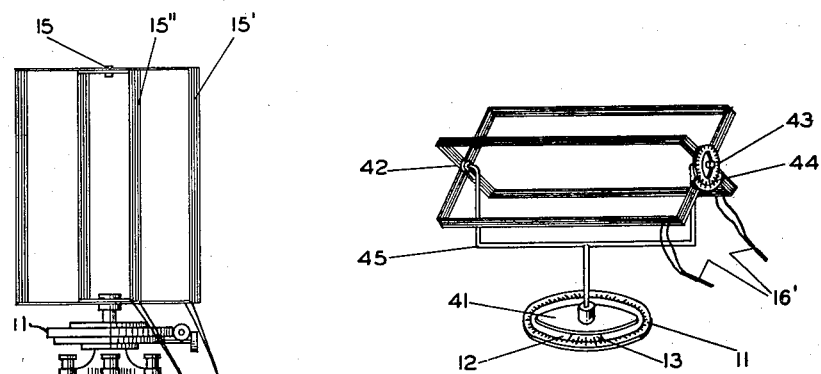
Figure 1:
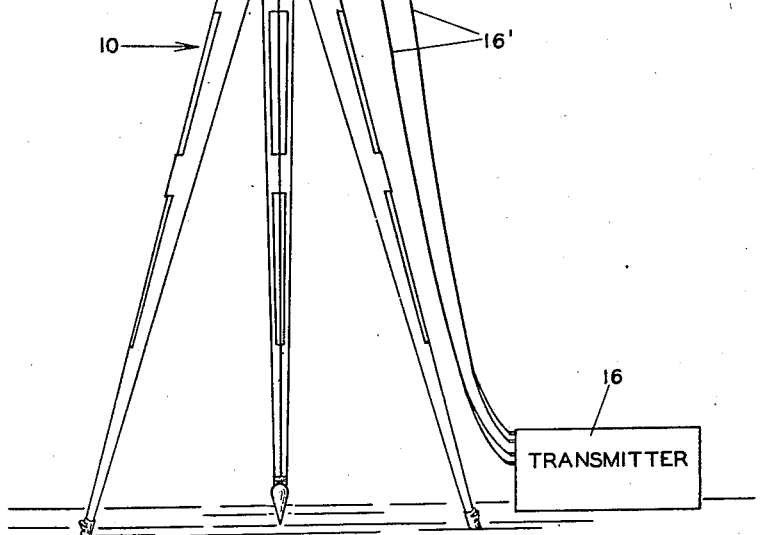
Figure 6:
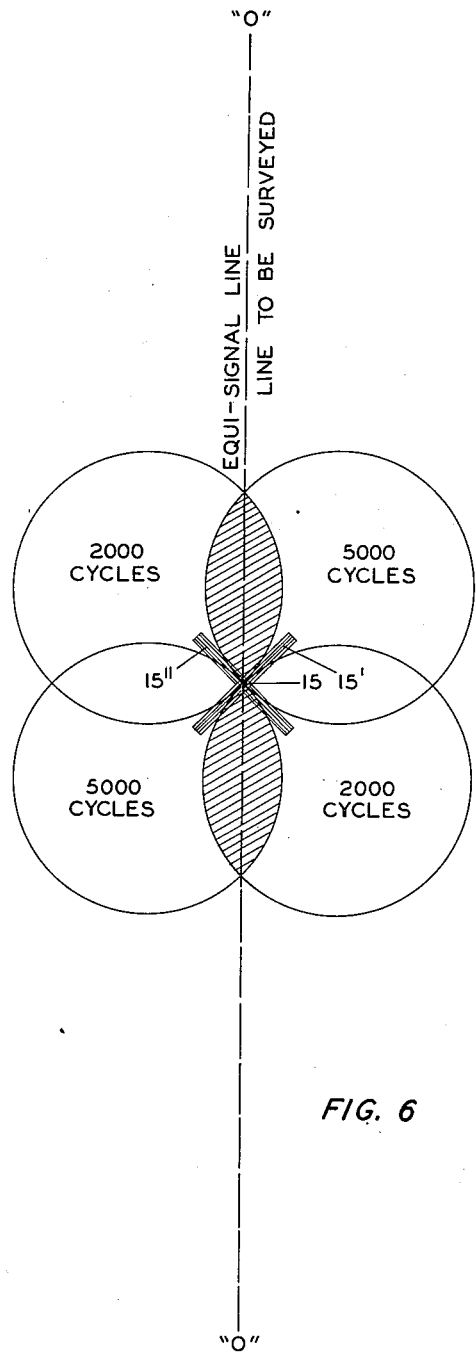
Figure 7:
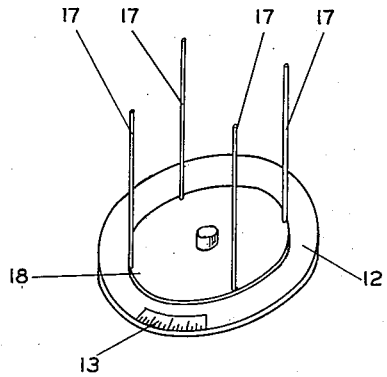
Figure 8:
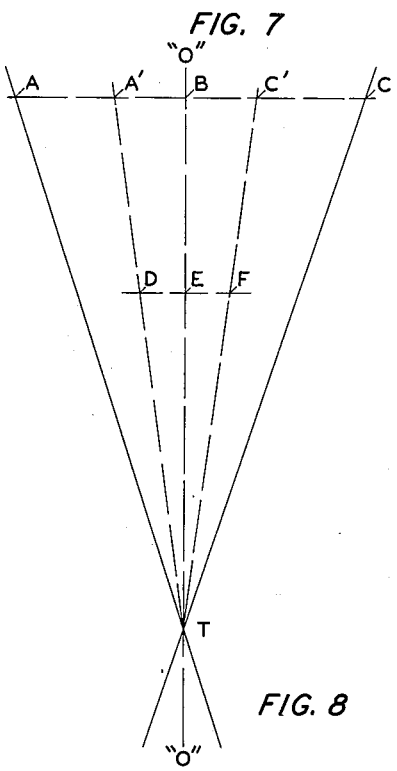

In the accompanying drawings, forming a part of this specification, and in which like numerals are employed to designate like parts throughout the same, Figure 1 is a perspective view of the transit, transmitter, and a directive transmitting antenna embodying the present invention, Figure 2 is a plan view of the directive transmitting antenna and inner and outer plates of the transit as illustrated in Figure 1, Figure 3 is a perspective view of the inner and outer plates of the transit and a horizontally mounted crossed loop antenna, Figure 4 illustrates diagrammatically a preferred type of transmitter utilized in connection with the transmitting antenna of Figure 1, Figure 5 is a diagrammatic representation of a preferred type of receiver used for receiving signals from the transmitting system shown in Figure 1, Figure 6 is a schematic drawing of the field strength pattern for the transmitting antenna of Figure 1, Figure 7 is a perspective view of the inner plate of the transit and a vertically mounted antenna utilized for the transmission of ultra high frequency or micro-waves, and Figure 8 is a schematic representation illustrating how a traverse may be measured by means of the present invention.

Before continuing with any further description of the drawings, it should be noted that the present invention is based upon the utilization of crossed loops for directive transmission of waves of radio frequencies. Both loops may have the same radio frequency impressed on them but the energy fed to one is modulated at one signal frequency and the energy fed to the other at a different signal frequency.

In the drawings, wherein for the purpose of illustration, is shown a preferred embodiment of the present invention, the numeral 10 in Figure 1 designates generally the transit. This transit resembles the ordinary engineer's transit in that it is composed of the conventional equipment and attachments; such as, a tripod, plumb bob, leveling screws, clamps, plates, vernier, etc. Inner and outer plates 11 and 12, Figures 1 and 2, are adapted to be rotated and aligned with zero points coinciding in the customary manner. Outer plate 11 is graduated in degrees and half degrees and the inner plate 12 carries a vernier 13 to obtain very exact readings of the plate settings. As will be observed in Figure 1 of the drawings a directional antenna, designated generally at 15, composed of crossed loops 15' and 15" replaces the usual telescope associated with an engineer's transit.

Antenna 15 is so constructed that the loops 15' and 15" are at substantially right angles with respect to each other. These loops may be constructed in any suitable manner but preferably on non-conducting frames. Around the outside of the frames are wound turns of wire, which may be of any suitable size, forming a complete loop in the usual manner. The ends of the wires forming the loops are connected through the electrical conductors 16' with the transmitter 16, Figure 1.

Each loop of antenna 15 is energized by continuous radio frequency waves, energy received from any particular loop being distinguished from energy received from the other loop of the system by the frequency of the modulation. Since the energy or intensity characteristics of the waves transmitted from the loops of antenna 15 are the same, a receiver located on the line O—O, Figure 6, bisecting the angle formed between the loops 15' and 15" will receive equal intensity signals from both transmitting loops.

It should be noted that antenna 15 is removably mounted on the inner plate 12 of the transit so that in the event that it is desired to substitute a phased vertical antenna 17 of the type illustrated in Figure 7 or the horizontally mounted crossed loops antenna 42, shown in Figure 3, the change can readily be made. Antenna 17 is mounted upon a base 18 which is preferably circular in form and adapted to be removably fitted on the inner plate 12 of transit 10. Antenna 42 is similarly mounted. This antenna is supported by a cross member 45 mounted upon base plate 41 which is adapted to be removably attached to the inner plate 12 of the transit 10. A vertical scale 43 with an attached vernier 44 is provided so that the angle between a horizontal plane and the plane bisecting the angle between the crossed loops 42 may be measured.

In Figure 4 of the drawings is shown a preferred type of radio transmitter, indicated generally by the numeral 16 in Figure 1. This transmitter has two radio frequency amplifiers 19 and 20. For signal purposes, one loop 15" is energized from radio frequency amplifier 19 which is modulated; for example, at 2000 cycles by the modulator 22. Loop 15' is energized from radio frequency amplifier 20 which may be modulated at 5000 cycles by the modulator 23. In order that the operator of the transit 10 may communicate vocally with the operator at the receiving unit 31, microphone 26 and audio frequency amplifier 25 are provided and may be connected with radio frequency amplifier 19, modulated at voice frequencies by modulator 22, and loop 15' by means of the disconnecting switch 27.

The audio frequencies produced by the action of the voice on the microphone 26 are amplified in the audio frequency amplifier and impressed on the modulator 22 by closing the contacts of the switch 27. The 2,000 cycle modulation may be discontinued while the operator of the transit communicates with the operator at the receiver, in which case the modulator 22 will respond only to audio frequency from the A. F. amplifier 22 to modulate the carrier wave from the oscillator 24, or the audio frequency may be superposed on the 2,000 cycle modulation. The audio frequencies are separated from the signal frequencies in the receiver 28. As shown in Figure 4, all radio frequencies are derived from a common oscillator 24 which maintains the energy in each loop at a constant level. It is to be understood that the radio frequency may be; for example, 1000 kilo-cycles, or if desired, any other value may be used.

In this way a beam of the general pattern shown in Figure 6 may be created which can be utilized to replace the former telescopic line of sight on the engineer's transit. If the receiver is located to one side of the equi-signal line O—O it will receive stronger signals from one loop and weaker signals from the other loop, whereas, if the receiver is located on the other side of line O—O weaker signals will be received from the first loop than from the second loop.

The receiving unit, indicated generally by the numeral 31 in Figure 5, consists of a conventional receiver 28, a rod antenna 29 connected to the receiver, and a supporting rod 30 which may be connected to serve as a ground for the receiver. Antenna 29 may be of any desirable type of receiving antenna including a directional type. Radio receiver 28 is provided with 2000 cycle filter 32 and a 5000 cycle filter 33 at the signal output end. The output of each filter is connected to a separate coil 34 and 35 of a D'Arsonval type galvanometer 36 provided with a graduated scale 37. An audio frequency amplifier 38 and headphones 39 are provided to complete the communication circuit between the transit 10 and the receiving unit 31. In addition, a clock mechanism 46, adapted to start upon receipt of a radio signal from transmitter 16 and to stop upon receipt of a sound wave at microphone 47, is provided for measuring distances. This will be more fully described later in the specification.

Receiving unit 31 as above described is adapted to receive signals from both loops and is provided with galvanometer 36 for comparing or indicating signal intensities. Thus, if the receiving unit is placed directly on the equi-signal line O—O, the galvanometer will show a zero reading, or balanced condition, on scale 37, since the energy received from each filter 32 and 33 will be equal. If the hand 40 of the galvanometer is deflected from the zero position the receiving unit 31 is not on the equi-signal line, the energy received by the filters not being equal. The amount and direction of this deflection indicates the extent and direction that the receiving unit has deviated from the equi-signal line O—O.

The operation of the radio transit and method of using this equipment to conduct a survey is as follows:

Referring specifically to Figure 8, measuring angles between known points is accomplished by setting up the transit 10 over the point T; for example, connecting the transmitter 16 to either directional antenna 15 or 17 as preferred and transmitting a beam as indicated in Figure 6. Inner and outer plates 11 and 12 of the transit are aligned with the zero points coinciding and clamped in the usual manner so that they will not move in relation to each other, but only in relation to the transit. If the crossed loops 15 are being used, inner and outer plates 11 and 12 are rotated until the line bisecting the angle between the loops is in the direction of point A. This establishes the equi-signal line O—O approximately on the line T—A. Receiving unit 31 is placed so that its antenna 29 is directly over point A. Antenna 15 on the transit is now turned back and forth until the energy received by the filters 32 and 33 on the receiver 28 is equal. As above described, when this point is reached, the galvanometer 36 on the receiver will read zero, or in the balanced position, which indicates that the equi-signal line O—O is directly on the line T—A. Outer plate 11 is clamped so that it will not turn and inner plate 12, carrying the antenna, is unclamped so that it is free to move in relation to outer plate 11. Receiving unit 31 is then moved to point C and the above procedure is repeated to establish the equi-signal line from the transit to point C. When this is accomplished, the angle A—T—C may be read directly on the outer plate 11 of the transit in the usual manner.

Linear distance between known points such as B and T may be determined in two ways, one is by using the difference in the speed of travel of sound and radio waves. The clock mechanism 46 serves to measure the time required for sound to travel from the transit to the receiver; the clock is started in response to a radio impulse and stopped in response to the receipt of a sound wave at microphone 47, Figure 5, by suitable apparatus, for example, electrical relays. A bomb is exploded at the transit at the same instant that a radio signal is sent and the clock mechanism measures the difference in time required for receipt of the two reports. Since the rate at which a sound wave travels in air is definitely known and the elapsed time is recorded on the clock, the linear distance traveled by the wave can be determined by multiplying the rate at which sound travels from the transit in the direction of the receiver by the units of time required for the sound to travel from the transit to the receiver as measured by the clock.

The second and preferred method of measuring the distance between points T and B, Figure 8 consists of measuring the width of the beam at B and utilizing a relationship similar to that established when stadia readings are taken with the ordinary engineer's transit or plane table. By moving the receiver 31 along a normal to line T—B toward A, until an arbitrary energy reading; for example, 3 units are noted on the galvanometer scale 37, point A' may be established. If the receiver is then moved in the opposite direction, from B toward C, point C' is established when the energy reading is again 3 units. The length of the line A'—B—C' is then measured directly with a steel tape or in any other preferred manner. It will be obvious that the length of line A'—B—C' bears a definite and constant relationship to the length of line T—B which can be utilized to determine the distance between the points T and B. Assuming the receiver 31 had been moved along the line D—E—F until energy readings of 3 units were again established as above described, the points D and F would be definitely established on the line D—E—F. It will be seen that the length of the line D'—E—F' bears the same relationship to the line T—E that line A'—B—C' bears to line T—B. This relationship can be utilized through the similarity of the triangles created to effect a geometrical determination of the distance between the transit and any other known point. It is also evident that by determining the length of the line A'—B—C' and measuring the angle A'TC' between the points A' and C' a trigonometrical solution of the triangles may be obtained and the length of any of the sides established.

It is to be noted that indicator 37 measures the comparative strength of the two frequencies transmitted from the transit. The system is only used at distances where the power is sufficient to operate the indicator. In other words, the transit and rod would not be operated at such a great distance that one signal acting alone on indicator 37 would not give the needle a full-scale deflection. Thus, the reading of three units mentioned above would indicate that one signal was a certain amount stronger than the other at such a point. The point would be a determinable distance from the edge of the equisignal zone. A point further out along the beam where the reading of the indicator is the same would be the same distance from the edge of the equi-signal zone and, therefore, the two points would lie in a line parallel to the boundary of the beam.

Setting a point in a line is accomplished by turning the antenna 15 on the transit until the beam is in the desired direction indicated by the relative position of the plates 11 and 12. The receiver 31 is then moved across the path of the beam until the galvanometer 36 reading at zero indicates that rod antenna 29 is in the center of the beam. Once the beam from the transmitter is established in the proper direction, the receiver 31 may be moved to any intermediate point desired. This method can also be used whenever it is desired to run a line at a given angle with another line. A modification of the method would be the extension of a straight line over a hill or swamp or the setting of intermediate points on a line the direction of which is fixed by a more distant point.

It should be noted at this point that the vertical antenna 17, Figure 7, may be substituted for the crossed loop antenna 15, if desired. In the event that micro-waves are utilized in the transmission system applicants prefer to use a system of co-phased vertical antenna to produce a directional beam. Applicants also contemplate the use of various antenna array consisting of a number of antennas separated in space and electrically connected in a definite phase relation. As is well known in the radio art, such antenna arrays make possible highly directional antenna systems. Thus, a broadside array, consisting of a series of elementary radiators uniformly spaced along a line and excited in phase, concentrates the radiation in a direction at right angles to the line of array and gives very little radiation in other directions. Typical directional characteristics for such arrays consist of a beam sharply defined in the horizontal plane and having its maximum at right angles to the line of array. The sharpness of this main beam in a horizontal plane depends primarily upon the over-all length of the array and is substantially independent of the spacing between adjacent antennas provided this spacing does not exceed about three-quarters of a wave length. In any event the present invention contemplates the use of any antenna system which will give the type beam desired such results being readily accomplished by systems well known in the art.

Measuring vertical angles and difference in elevation between two points may be accomplished by using the crossed loop horizontally mounted antenna 42, Figure 3. After leveling the plates 11 and 12 of the transit over point T of known elevation, antenna 42 is rotated until the zero points on the scale 43 and vernier 44 coincide. One of the planes bisecting the angles between the crossed loops of antenna 42 will be horizontal. It is now evident that a beam transmitted from this antenna will have an equi-signal line in a horizontal plane. Considering that point B in Figure 8 has a different elevation than point T, moving receiving unit 31 up and down vertically in respect to point B, whose elevation is to be determined until the galvanometer 36 reads zero will establish the equi-signal line in respect to point B. The height of antenna 42, at the equi-signal line, above point T is added to the elevation of point T to determine the elevation of the equi-signal line. Subtracting the distance that the equi-signal line is above point B from the elevation of the equi-signal line, as previously determined, establishes the elevation of point B with respect to point T.

Where surveying by means of the present invention is being carried on in dense undergrowth or where the visibility is obscured for any reason, the provision of microphone 26 and associated equipment at the transit and earphones 39 at the receiver makes it possible for the transit man to direct the rod man by radio communication instead of the usual hand signals. Obviously, where necessary two-way communication can be used.

It will be readily recognized by those skilled in the art that this equipment makes topographic work possible by several methods, mainly by using different combinations of the methods described above for obtaining distances, direction and measurement of vertical and horizontal angles. Various combinations involving the use of a plurality of transits may also be effected to complete a survey since the general methods of surveying are applicable using the application of the radio beam to the present invention.

Applicants desire it to be understood that the particular values of the various frequencies chosen are for purposes of illustration only and not limitation and that any suitable values of the frequencies may be chosen dependent upon the factors involved.

Having thus described our invention, we claim:

1. A method of surveying comprising setting up a directional beam of radio frequency energy at one point, receiving the radio signals at a second point, directing the beam at the second point, receiving the radio signals at a third point, directing the beam at the third point, and measuring at the source of the beam the angle between the first position of the beam and the second position of the beam.

2. A method of locating a point with respect to two known points comprising setting up a beam of radio frequency at one of the known points, directing the beam toward the second known point, receiving the radio signals at the point to be located, directing the beam toward the receiving point, measuring at the source of the beam the angle between the two positions of the beam, and measuring the distance from the point to be located to one of the known points.

3. A method of measuring the distance between two points comprising setting up an equi-signal zone beam of radio frequency at one point, directing the beam at the second point such that the equisignal zone passes through the second point, and measuring the distance between the equal energy positions on opposite sides of the equisignal zone at the second point.

4. A surveying system comprising a transit including a support, a pair of plates rotatable relative to one another on the support, indicia on one of the plates arranged to show the amount of relative rotation of the plates, antenna means in fixed relation to one of the plates for radiating an equi-signal beam of radio frequency energy, a transmitter for supplying energy to the antenna means and a rod including a receiving antenna having means associated therewith for indicating when the rod is in the center of an equi-signal beam of radio frequency energy.

5. A system of the character described in claim 4 wherein an intelligence signal modulator is associated with the transmitter and an intelligence signal detector is associated with the receiving antenna whereby communication between the two is possible.

ARTHUR H. RINEY.
JAMES D. DURKEE.